S. W. McKILLOP.
GREASE CUP.
APPLICATION FILED DEC. 13, 1912.
1,073,154.
Patented Sept. 16, 1913.
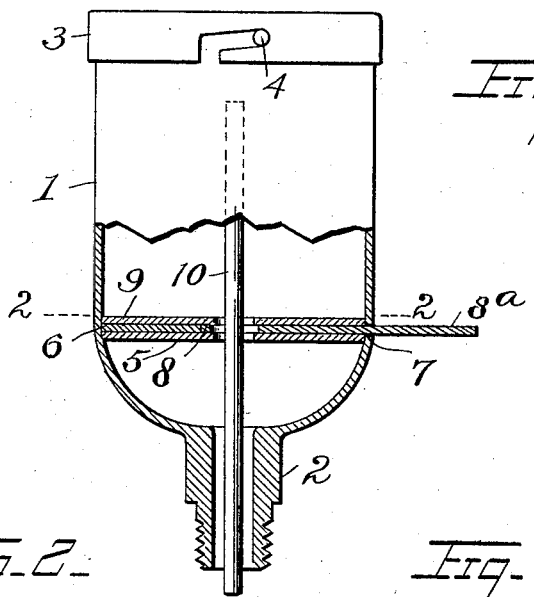
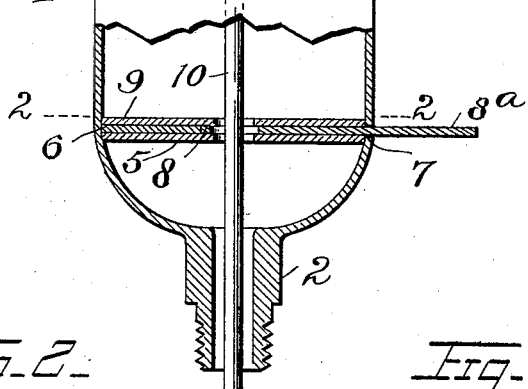
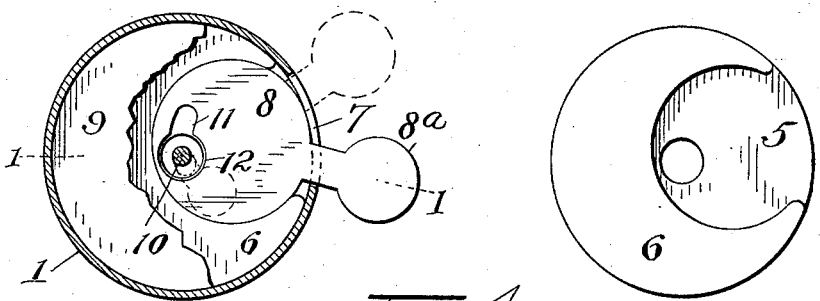
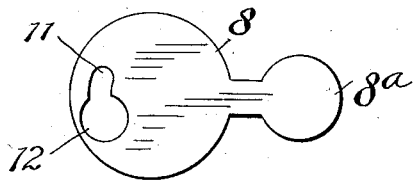
Witnesses.
E. B. Gilchrist.
A. J. Hudson.
Inventor
Samuel W. McKillop
by Thurston & Kwis
Attys

UNITED STATES PATENT OFFICE.

SAMUEL W. McKILLOP, OF CLEVELAND, OHIO, ASSIGNOR TO THE THATCHER-RUETER MANUFACTURING COMPANY, A CORPORATION OF OHIO.

GREASE-CUP.

1,073,154.      Specification of Letters Patent.     Patented Sept. 16, 1913.

Application filed December 13, 1912. Serial No. 736,471.

*To all whom it may concern:*

Be it known that I, SAMUEL W. McKILLOP, a citizen of the United States, residing at Cleveland, in the county of Cuyahoga and State of Ohio, have invented a certain new and useful Improvement in Grease-Cups, of which the following is a full, clear, and exact description.

This invention relates to a grease cup which is intended for the dispensing of heavy greases which are normally of such consistency that they do not flow. Greases of this character are in some respects better lubricants than oil, and they have the added advantage that they are cheaper. In utilizing greases of this character as lubricants, the usual method is to employ a rod of copper or other good conducting material which bears upon the shaft and extends into the grease cup, the heat of friction between the rod and the shaft furnishing sufficient heat to melt portions of grease adjacent the rod which will flow along the rod to the bearing.

In the forms of cups with which I am familiar, there have in many of them been no means for controlling the flow of the lubricant after it has become heated, so that frequently excess of lubricant have been applied to the shaft resulting in waste of lubricant, and further, it is quite undesirable that the lubricant escape and drop from the bearings.

Some forms of grease cup in which regulation has been attempted have failed to make the regulation effectual for various reasons.

It is the object of this invention to provide a grease cup of the type heretofore described in which the regulation of flow of the grease along the rod from the cup shall be positively and certainly regulated, and further providing a positive shut-off of the flow of grease when this may be desirable.

Generally speaking, the invention comprises the elements and combinations thereof set forth in the accompanying claims.

Reference should be had to the accompanying drawings forming a part of this specification, in which Figure 1 is a vertical elevation, partly in section, of the grease cup; Fig. 2 is a section along the line 2—2 of Fig. 2, with certain portions further sectioned to show the valve construction; Fig. 3 shows in plan the features of construction of the valve; and Fig. 4 shows in plan the movable portion of the valve.

The cup or container portion 1 is of usual shape, and may be made of any desired size. This cup is provided with a depending portion 2, a portion of which is threaded and which is adapted to be secured upon a bearing which is provided with a threaded opening to receive it.

The upper part of the depending portion 2 is usually formed with sides or faces in order that a wrench may be applied thereto to turn the cup.

The cup is preferably made by drawing from a tube of metal, in which event the portion 2 will be separately formed and welded to the cup blank, or if desired, the whole cup and the depending portion 2 may be drawn with a single operation.

The cup is provided with a cover 3 which is secured upon the cup 1 in any desired manner, and for the purpose I have shown a bayonet joint as indicated at 4.

Within the cup there is placed a partition or disk 5, this disk being of substantially the same diameter as the interior of the cup and lies upon shoulders which are formed upon the interior wall of the cup. Lying upon this disk is a second disk 6 which is of the form shown in Fig. 3. That is to say, there is a substantially circular portion removed from this disk, the center of the circular portion removed being non-coincident with the center of the disk 6. This disk is placed upon the disk 5 in such manner that the opening in the edge of the disk, formed by the circular portion removed, will lie substantially coincident with a slot 7 which is formed in the side of the cup 1. The slot, as will be noted, is of slightly less length than the opening in the disk 6, this being for the purpose of giving the movable portion of the valve plenty of room for movement.

Coöperating with the disk 6 is a member 8, which is of the form shown in Fig. 4, the larger circular part fitting within the opening in the disk 6, while the portion 8ª of this member extends through the slot 7 to the exterior of the cup, so that movement may be imparted to the disk 8 when desired.

Above the disk 6 and the disk 8 is a disk 9. This disk is similar to the disk 5 and is made to have a driving fit with the side wall of the cup. When therefore, it is placed as indicated in the drawing, that is to say in contact with the disk 6, it will hold this last mentioned disk against movement, for the friction or pressure between the disks 5 and 9, bearing upon opposite sides of the disk 6, will be sufficient for the purpose.

The valve portion 8 is made of sheet metal, which is of slightly less thickness than the thickness of the plate 6. Therefore the friction between the member 8 and the disks 5 and 9 will not be so great as to prevent movement. However, there will be sufficient friction so that the member 8 does not work entirely free, the friction being sufficient to hold the member in any adjusted position with respect to the disk 6 to which it may be moved.

The disks 5 and 9 are provided with central alined openings which are circular and are of greater diameter than the rod 10, which extends through these openings. The disk 8 is also provided with an opening indicated at 12, which is of substantially the same size as the opening in the disks 5 and 9. Extending from this opening 12 is a slotted portion 11, which in width is substantially the diameter of the rod 10, and the end of the slot 11 is rounded on a radius which is substantially the same as that of the rod 10. It will be apparent therefore, that when the disk 8 is so turned that the rod enters the slotted portion 11, the flow of lubricant will immediately be diminished and as the disk is advanced to the position shown in dotted lines in Fig. 2, the rod will engage the rounded end of the slot 11 and will be moved toward the side of the openings in the disks 9. The radius of curvature of the opening in this disk, while not exactly the same as the radius of the rounded end portion of the slot 11, is nevertheless so nearly so that the passage of lubricant along the rod is substantially prevented, the rod being entirely encircled by the valve mechanism.

It will be apparent that the disks 5, 6, 8 and 9 may be formed from sheet metal by stamping, and in this manner, the cost of production of the cup is brought to a minimum.

The rod 10 functions with respect to the grease in the cup as usual in this type of lubricators. The lower end of the rod will rest upon the shaft to be lubricated, and the heat produced by the friction between the shaft and the rod will be conducted by the rod 10 throughout its length. This will cause a melting of the grease within the rod which immediately surrounds the cup, which melted grease will flow along the rod to the bearing. The flow of the grease may be regulated by movement of the valve disk 8 in the manner which has heretofore been described, and if desired, the flow of the grease may be entirely stopped.

Particular stress is laid upon the fact that the valve mechanism coöperates directly with the rod in regulating or stopping the flow of melted grease. The grease used is so heavy that it will melt practically only in those portions which immediately surround the rod. Therefore, the grease should be allowed to flow along the rod to remain in fluid consistency, in order to give satisfactory results.

Any construction which requires that the grease be deflected from the rod to pass through a valve mechanism is unsatisfactory and unreliable in action, for the grease becomes thick as it leaves the rod and quickly hardens.

Having thus described my invention, what I claim is:

1. In a grease cup, the combination with a container having an outlet, a heat conducting rod extending through the outlet and into the container, and a valve mechanism in the container, surrounding the rod and adapted to close against the rod.

2. In a grease cup, the combination with a container having an outlet, a heat conducting rod extending through the said outlet into the container, a valve mechanism within the said cup, said valve mechanism being provided with a stationary portion and a movable portion, movement of the movable portion causing the rod to ultimately be engaged on all sides by the valve mechanism.

3. In a grease cup, the combination with a container having an outlet, a heat conducting rod extending through the said outlet into the container, a valve mechanism within the cup, provided with an opening through which the heating rod extends, said valve mechanism also being provided with a movable member which in its movement varies the opening in the valve mechanism through which the rod extends and eventually engages the rod on all sides.

4. In a grease cup, the combination with a container having an outlet, a valve mechanism within the said container, said valve mechanism comprising a disk member having a portion removed, and a movable member which is adapted to be guided in the opening in the first mentioned disk member, there being an opening through the said movable member, a rod extending through the said opening, substantially as described.

5. In a grease cup, the combination with a container having an outlet, a heat conducting rod extending through the said outlet into the container, a valve mechanism within the cup, said valve mechanism comprising a supporting means, a disk held by said supporting means, a portion of said disk being removed, a movable member being formed to fit the portion of the disk removed, the disk serving to guide the movable member as it is moved, an opening through the said movable member, and through the support, through which the aforesaid rod extends, the movement of the movable member of the valve serving to vary the size of the opening in the valve mechansm through which the rod extends.

6. In a grease cup, the combination with a container having an outlet, a heat conducting rod extending through said outlet into the container, a valve mechanism within the container, said valve mechanism being provided with an opening through which the rod extends, said valve mechanism being provided with a movable portion having a slotted opening, the slot being of substantially the diameter of the rod, and means extending upon the outside of the container for moving said movable member.

7. In a grease cup, the combination with a container having an outlet, a heat conducting rod extending through the outlet into the container, a valve mechanism within the cup, said valve mechanism comprising a disk adapted to be supported in the cup, a superimposed disk provided with an opening, a movable valve member adapted to coöperate with the last mentioned disk and guided by the walls of the opening therein, the said movable valve portion being of slightly less thickness than the thickness of the superimposed disk, and a holding disk adapted to have a driving fit with the walls of the container, said disk engaging the superimposed disk, whereby the superimposed disk is firmly held between the disks upon the opposite sides thereof, and means extending upon the outsides of the container for moving the movable member of the valve.

In testimony whereof, I hereunto affix my signature in the presence of two witnesses.

SAMUEL W. McKILLOP.

Witnesses:
A. J. HUDSON,
N. C. HUBBARD.

---

Copies of this patent may be obtained for five cents each, by addressing the "Commissioner of Patents, Washington, D. C."